United States Patent [19]
Reilly

[11] Patent Number: 5,476,186
[45] Date of Patent: Dec. 19, 1995

[54] UNIVERSAL REPLACEMENT CARAFE FOR COFFEE MAKER

[75] Inventor: Thomas J. Reilly, North Massapegua, N.Y.

[73] Assignee: Gemco Ware, Inc., Freeport, N.Y.

[21] Appl. No.: 180,807

[22] Filed: Jan. 6, 1994

Related U.S. Application Data

[63] Continuation-in-part of Ser. No. 975,522, Nov. 12, 1992, abandoned.

[51] Int. Cl.⁶ ..................................................... B65D 39/10
[52] U.S. Cl. .............................. 220/212; 220/729; 99/306
[58] Field of Search .................................. 220/212, 694, 220/729, 731; 215/227, 228; 99/279, 295, 306

[56] References Cited

U.S. PATENT DOCUMENTS

| | | | |
|---|---|---|---|
| 3,807,457 | 4/1974 | Logsdon | 220/287 X |
| 4,069,751 | 1/1978 | Gronwick et al. | 99/306 |
| 4,621,571 | 11/1986 | Roberts . | |
| 4,624,177 | 11/1986 | Ito . | |
| 4,667,587 | 5/1987 | Wunder . | |
| 4,872,402 | 10/1989 | Johnson . | |
| 5,150,803 | 9/1992 | Cartellone | 215/357 |
| 5,170,694 | 12/1992 | Salomon | 99/299 |

*Primary Examiner*—Jes F. Pascua
*Attorney, Agent, or Firm*—Robert D. Schaffer; Rogers and Wells

[57] ABSTRACT

A universal replacement carafe is presented and which may be used with coffee makers of different types. It includes removable adaptors which may be inserted into the lid of the carafe. In this way, the lid/adaptor combination can be made of the required height to engage the activation element of any coffee maker. Further, the adaptor can be positioned in any quadrant of the lid, so as to be able to engage an activation element at any portion of the coffee maker.

3 Claims, 6 Drawing Sheets

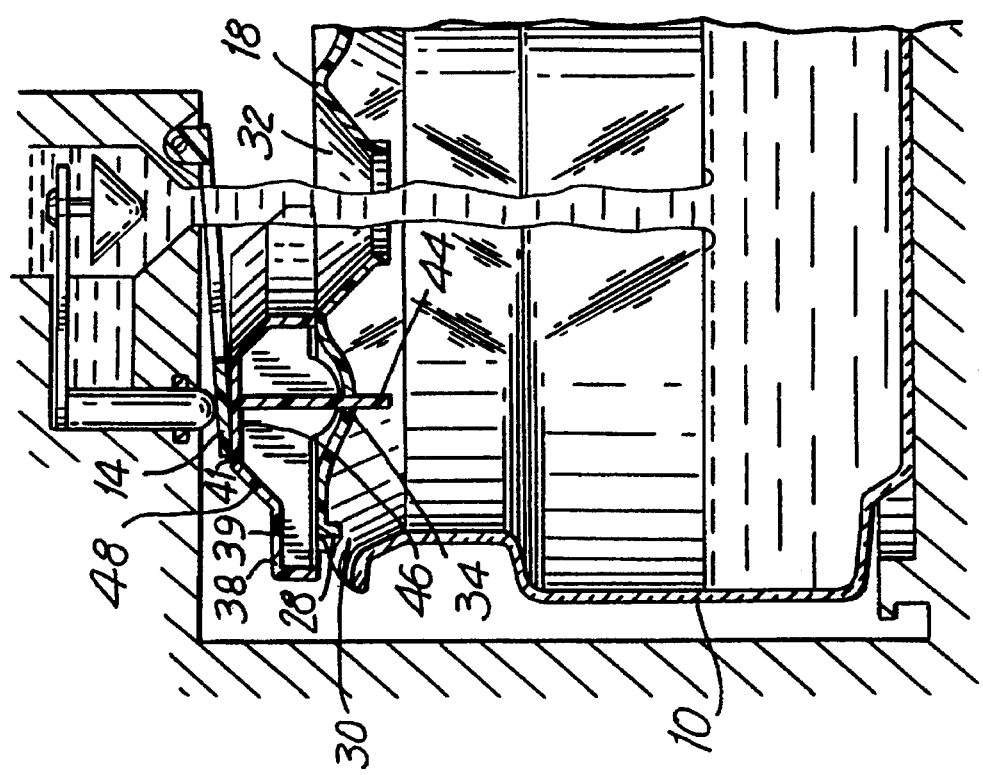
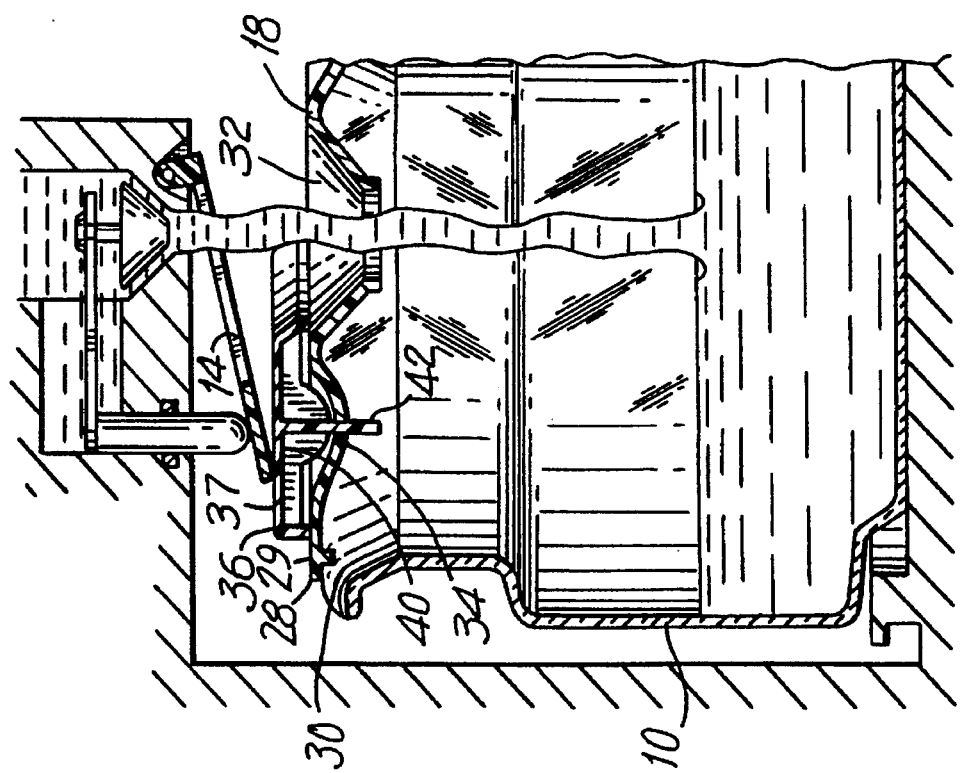

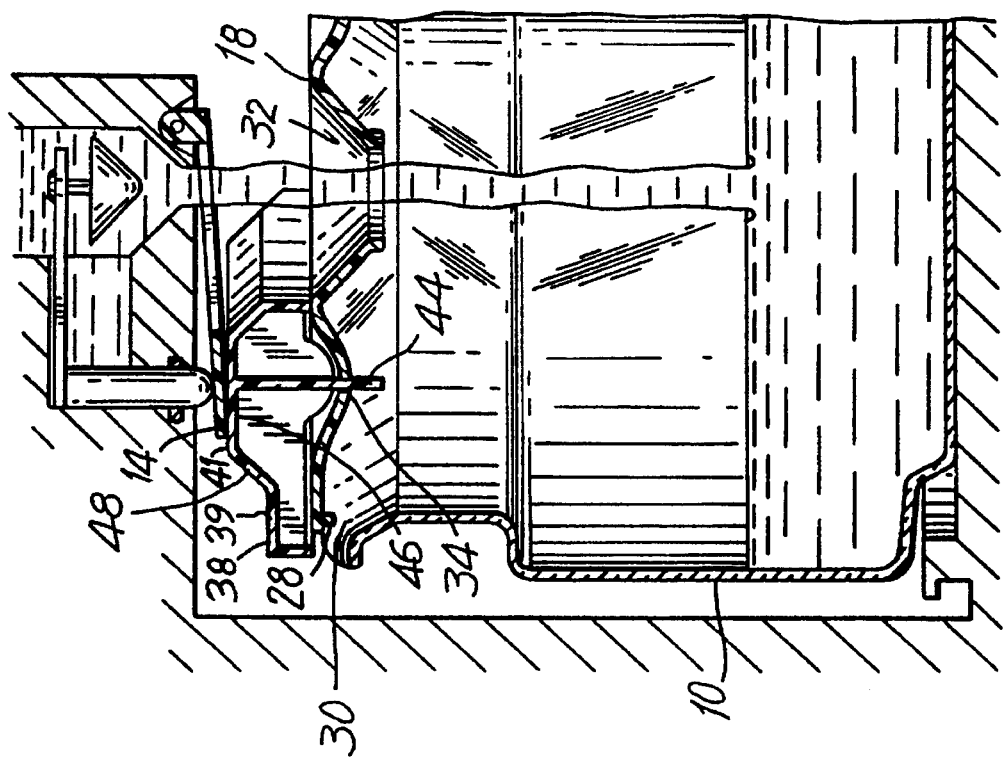
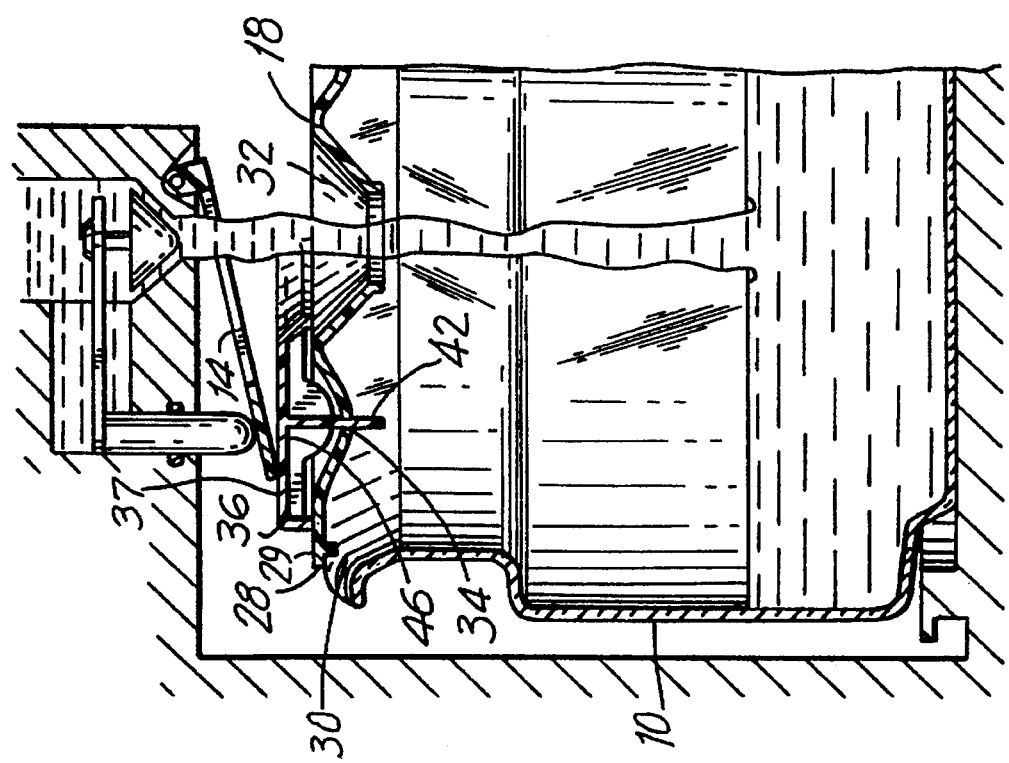

UNIVERSAL REPLACEMENT CARAFE FOR COFFEE MAKER

This is a continuation-in-part of application Ser. No. 07/975,522, filed Nov. 12, 1992 now abandoned.

FIELD OF THE INVENTION

The invention relates to a replacement carafe that can be used in most automatic coffee makers.

BACKGROUND OF THE INVENTION

In recent years, automatic drip coffee makers have become very popular and common in the marketplace. Many of these machines have activation switches, so that the flow of coffee occurs only when a carafe is in place in the machine. These activation elements are usually positioned, so that some portion of the carafe, or more usually the lid of the carafe, comes into contact with the activation element, and, thus activates the machine to permit the flow of coffee.

One of the problems in the prior art is that there is no standardization of the coffee makers and of the activation elements. Accordingly, from machine to machine, the activation element may be in a different location. As a result, carafes generally require different sized lids and/or bodies for each machine. For example, a replacement carafe and lid for a Braun coffee maker may not work with a Mister Coffee maker, because the carafe and lid will not be in the right position to activate the activation switch of the Mister Coffee coffee maker.

In the current market, it is necessary to buy a separate carafe for each different coffee maker. This is due to the fact that each machine has the activation element at a different location. There is no universal carafe in the marketplace, which can be used in any coffee maker of any design.

SUMMARY OF THE INVENTION

Therefore, it is an object of this invention to provide a replacement carafe that is universal and which may be used with coffee makers of any type.

On the universal replacement carafe of this invention, there is a conventional lid secured to the carafe in the conventional fashion. Around the central portion of the lid are a plurality of slits. Into these slits, prongs of an adaptor may be fitted, so as to hold the adaptor in place on top of the lid of the replacement carafe. By adjusting the position of the adaptor around the surface of the lid, and by selecting the adaptor of the correct thickness, the replacement carafe can be fitted, so as to be useable with most coffee makers of any type. By selecting the correct adaptor and placing it in the correct position on the lid, the replacement carafe can be made to fit most coffee makers, so that it will activate the activation element of the coffee maker.

BRIEF DESCRIPTION OF THE DRAWINGS

FIG. 4 is a cross-sectional view taken along Line 4—4 of FIG. 2 of a ten cup carafe.

FIG. 5 is a cross-sectional view taken along Line 5—5 of FIG. 3 of a ten cup carafe.

FIG. 6 is a cross sectional view similar to FIG. 4 of a twelve cup carafe.

FIG. 7 is a cross sectional view similar to FIG. 5 of a twelve cup carafe.

DETAILED DESCRIPTION OF THE INVENTION

Figure 1:
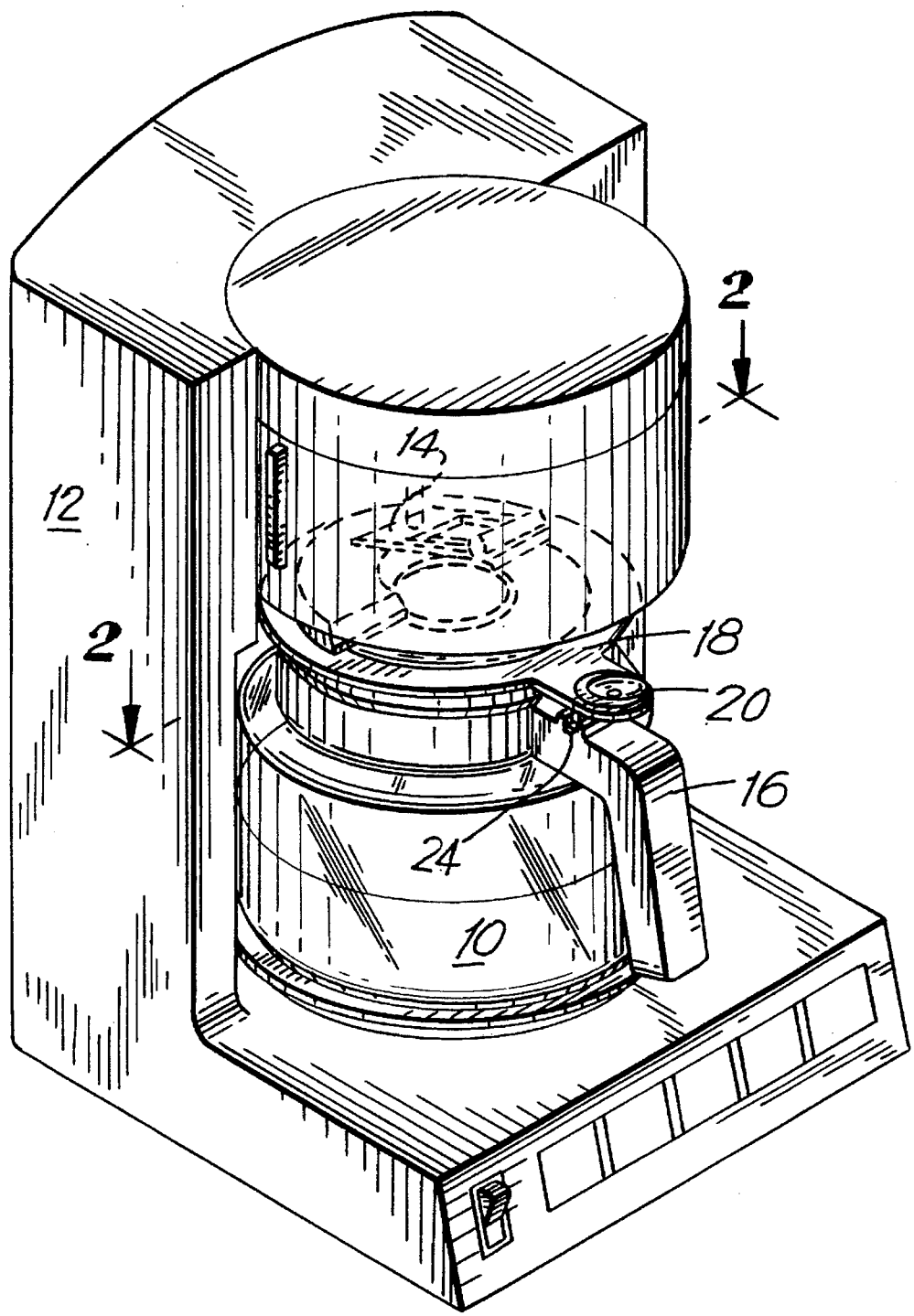
FIG. 1 is a perspective view of the universal replacement carafe in position on a coffee maker.
Figure 2:
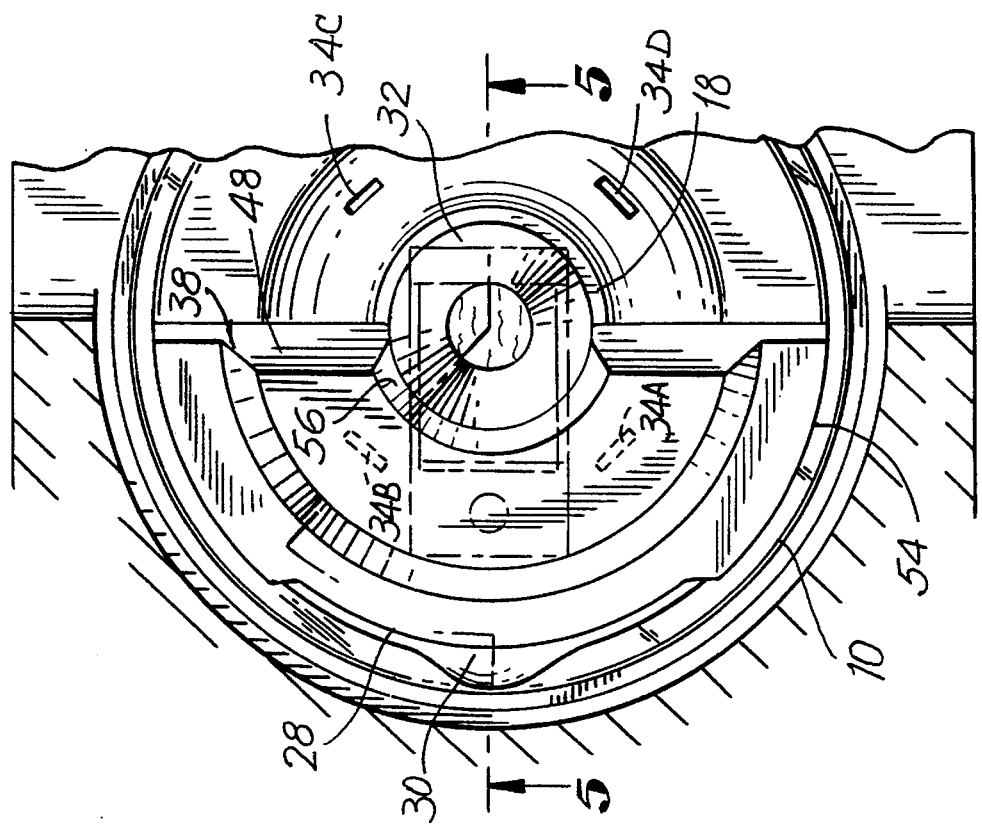
FIG. 2 is a cross-sectional view taken along the Lines 2—2 of FIG. 1.
Figure 3:
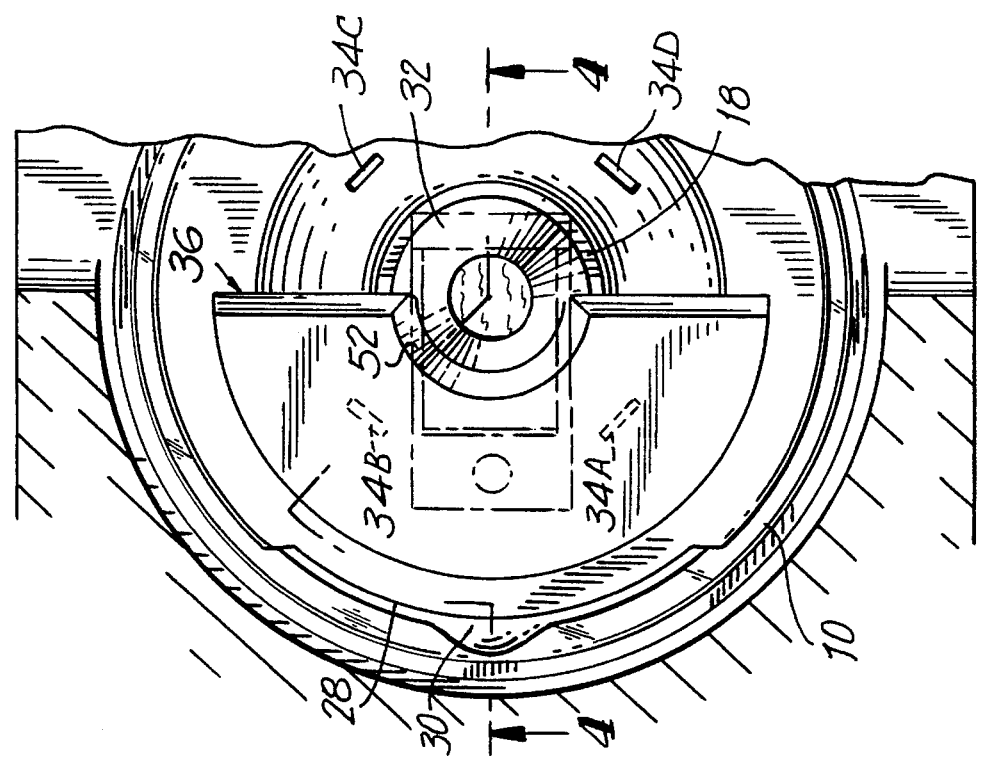
FIG. 3 is a view similar to FIG. 2, but showing an adaptor of a different size and construction.

The invention constitutes a universal replacement carafe 10 that may be used in most coffee makers. As shown in FIG. 1, when positioned in the coffee maker, the lid 18 of the carafe 10 comes into engagement with the activation element 14 of the coffee maker, and thus activates the unit to permit the flow of coffee.

Any conventional carafe 10 of any desired shape and configuration can typically be used with this invention. Further, the carafe may be made out of any suitable material. In the preferred embodiments, the carafe would be made from glass or pyrex or similar materials. In some embodiments, it may be desirable to make the carafe as an insulated unit.

The carafe may have any desired shape, but in the preferred embodiment it is the conventional round carafe with a flat bottom.

Figure 8:
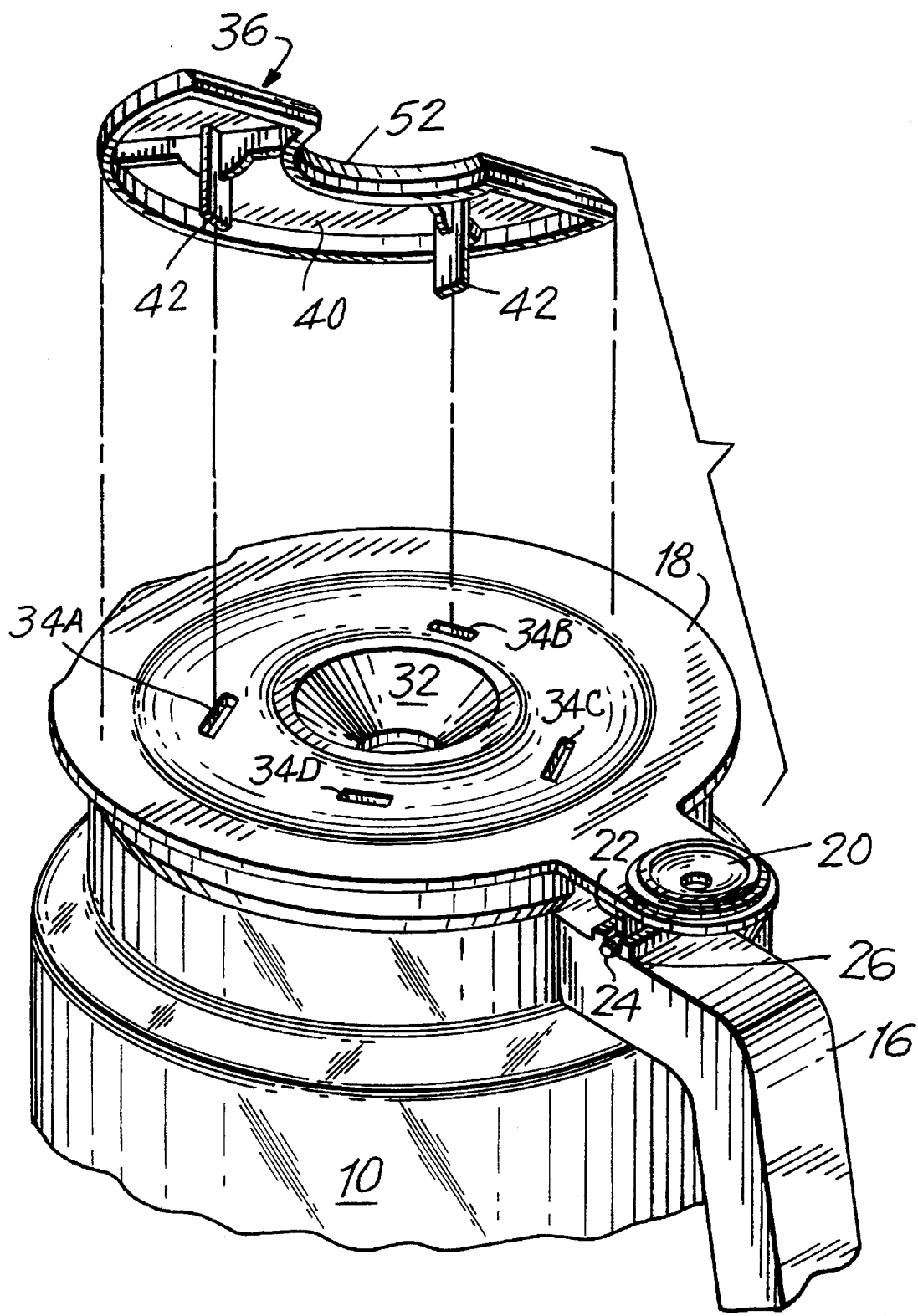
FIG. 8 is an exploded perspective view, showing the manner in which the adaptors are fitted into the lid of the universal replacement carafe.
Figure 9:
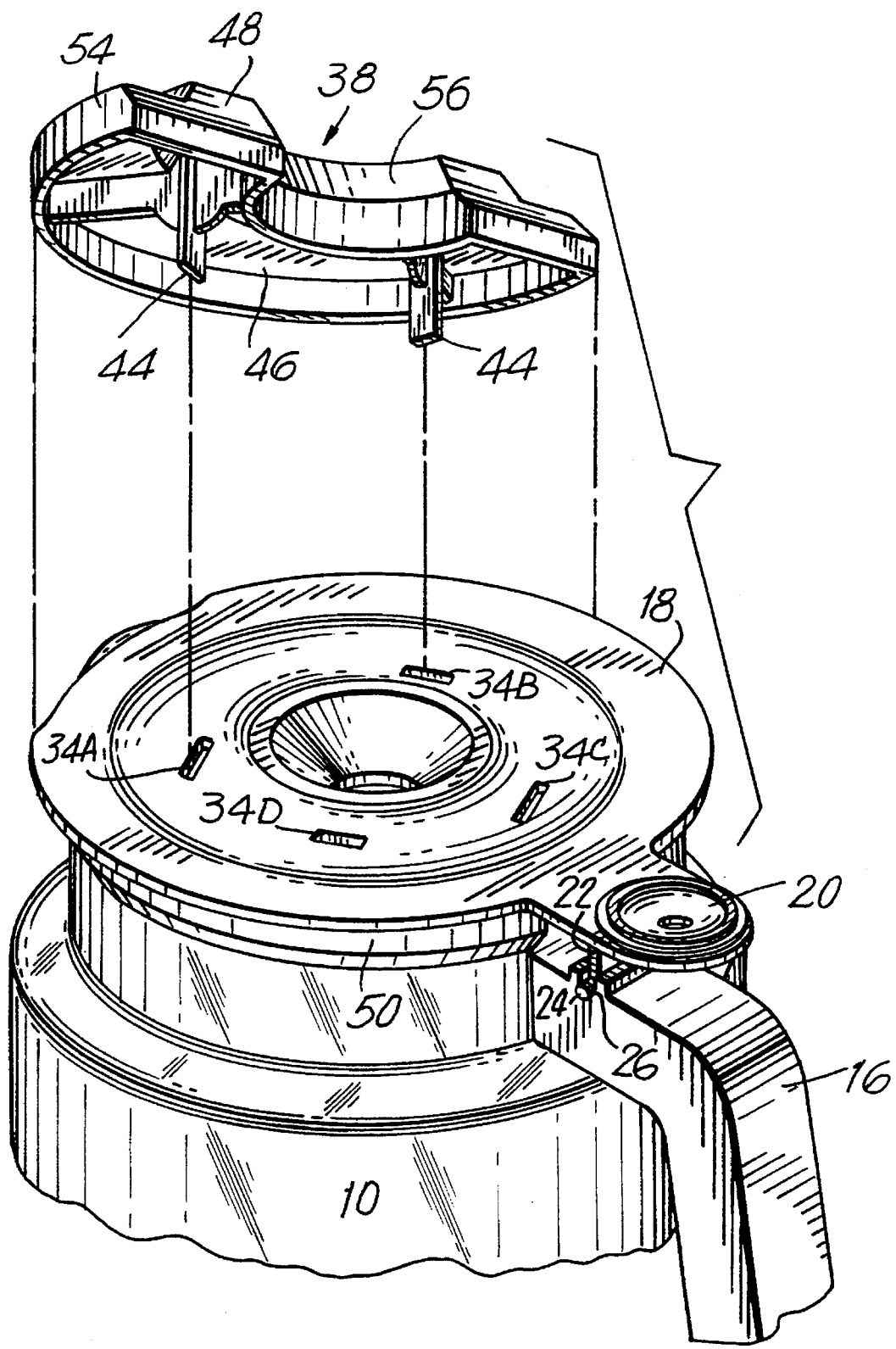
FIG. 9 is a view similar to FIG. 6, but showing an adaptor of a different construction.

For easier handling, the carafe 10 would have a handle 16. The handle may be any suitable material, and is preferably made of plastic in the preferred embodiment. The handle may be straight, or the more conventional "L" shape which is shown in FIGS. 1, 8 and 9.

The carafe would be fitted with a lid 18, which may be secured to the carafe in any suitable manner. Generally, the shape of the lid will be dictated by the shape of the carafe, so that the lid will fit securely over the top opening of the carafe.

In the preferred embodiment, the lid 18 has a thumb rest 20 extending outward from the top surface and periphery of the lid. This is for the purpose of permitting the user of the carafe to easily flip the lid up, in order to facilitate the flow of coffee from the carafe into a coffee cup. Extending downward from the thumb rest is a support 22 with diametrically opposed pins 24 on either side. These pins 24 then fit in respective arcuate seats 26 which are positioned on the top portion of the handle 16. In this way, the lid can pivot about the handle in order to flip up to some extent, to thereby facilitate the flow of liquid from the carafe.

As is typical of most lids for carafes, it may be desirable for the front portion 28 of the lid 18 to be of a slightly reduced radius, as compared to the remaining portion of the lid, so as to define a space 30 between the front portion 28 of the lid 18 and the outer edge of the carafe 10. This too will facilitate the flow of liquid from the carafe.

The lid may be made of any suitable material, and is generally made of plastic in the preferred embodiment.

The replacement carafe 10 can be made of any size, but would typically be made of a standard 10 (FIGS. 4 and 5) or 12 cup size (FIGS. 6 and 7), as these other sizes typically used with coffee makers. Of course, the invention could work equally well with 6 cup or 15 cup or any size carafe.

The lid 18 has a central opening 32, which will be in alignment with the drip nozzle of the coffee maker when the carafe is in position. This permits the flow of coffee from the coffee maker into the interior of the carafe.

On the top surface of the lid 18, a plurality of arcuate slots 34 are made. Preferably, each of these arcuate slots would have the same radius from the same point of origin. All of the slots should ideally be on the same circle. There may be any number of slots, and in the preferred embodiment, four slots are used. The length of the slots may be any suitable length (See FIG. 8 and 9).

The universal replacement carafe would include a plurality of adaptors. In the preferred embodiment, a first adaptor 36 (FIGS. 4, 6 and 8) and a second adaptor 38 (FIGS. 5, 7 and 9) are generally sufficient. In some applications, it may be desirable to have three or more adaptors, or possibly only a single adaptor.

The first adaptor is arcuate in shape and is essentially flat. Extending downward from the bottom surface 40 of the first adaptor 36 are a plurality of prongs 42. These prongs are intended for insertion into the arcuate slots 34 on the lid 18 in order to hold the adaptor in place on the lid. Any number of prongs may be used and, in the preferred embodiment, two prongs are used. The prongs would ideally be slightly smaller in width than the overall length of the arcuate slots, so that the prongs will be held securely on the lid. In some cases, it may be desirable for the bottom of the prongs to be rounded to facilitate insertion into the arcuate slots. The prongs would be of a length sufficient for them to extend through the arcuate slots and for the adaptor to sit squarely on top of the lid. (See FIGS. 4, 6, and 8). By use of the first adaptor 36 the height of the lid 18 can be adjusted, thereby creating two predetermined elevations for thereby activating actuators of two different coffee makers. By placing the adaptor 36 on the lid 18, the lid 18 can come into contact with a first coffee maker and the adaptor will come into contact with the activation element 14 of a second coffee maker when the carafe 10 is placed on the first of the second coffee maker 12. As the activation element can be in different positions on the coffee maker, the exact position of the adaptor on the lid may be varied in order to position it, so that it will come in contact with the activation element. The user of the replacement carafe will determine in which of the arcuate slots the prongs of the adaptor need to be fitted, so that the adaptor will be in the correct position.

In the front two arcuate spots 34A and 34B. In some coffee makers, the prongs of the adaptor will be fitted in the front two arcuate slots 34A and 34B, so that the adaptor will be along the front of the carafe and come into contact with an activation element in that section of the coffee maker. In some coffee makers, it will be desirable for the adaptor to be on the right side of the lid, or the left side or on the back portion. It will depend on the configuration of the coffee maker. As the adaptor can be easily removed from the lid and repositioned, it can be easily moved from position to position in order to ensure that it comes into contact with the activation element of the particular coffee maker being used with the carafe.

In connection with the use of the invention for a 10 cup universal replacement carafes with the Melitta model ACP-10, the Mister Coffee model SR-10 or the Sears model numbers 48011, 48144 or 67122 automatic drip coffee machines, the adaptor 36 would be positioned in the front two arcuate slots 34A and 34B; and, when used with the Mister Coffee SR-10 and SRX-40, SRX-50 or SRX-101 or the Sears model 67122, the adaptor 36 would be fitted in the left two arcuate slots 34A and 34D. In connection with the use of the invention for 12 cup universal replacements, for use with Mister Coffee SR-12, SRX-15 or SRX-20, the adaptor 36 would be fitted in the front two arcuate slots 34A and 34B.

For some coffee makers, the adaptor 36 may not be sufficiently thick to provide the required height for the lid and adaptor to come into contact with the activation element 14 of the coffee maker 12. In such situations, a second adaptor 38 may be used in lieu of the first adaptor.

The second adaptor is also arcuate in shape and has prongs 44 extending downward from the bottom surface 46. The second adaptor 38 is fitted on the lid 18 in the same manner as is accomplished with the first adaptor 36.

The second adaptor 38 is essentially the same construction and configuration and shape as the first adaptor, except that it is thicker and has two predetermined elevations 39 and 41 as shown in FIG. 5 and FIG. 7. Each of these two predetermined elevations are adapted for activating actuators on two different coffee makers. As an alternative to making the second adaptor thicker, it may have a raised surface 48 in order to provide the required height or thickness.

In connection with 10 cup universal replacement carafes, for use with the Mister Coffee Expert EXP-1 or the Sears model 67787, the adaptor 38 would be positioned in the front two arcuate slots 34A and 34B. In connection with the 12 cup replacement carafe, for use with the Proctor Silex models A-6312, A-6229, A-8737, 7830, 8736, A-83335 or A-8333 or the Sears Kenmore model 48036, the adaptor 38 may be placed in the front two arcuate slots 34A and 34B; and, for use with the Proctor Silex models A-6076 or A-6143 or the Sears model 48131, the adaptor 38 may be placed in the left two arcuate slots 34A and 34D.

If desired and necessary, additional adaptors of different thicknesses may likewise be used in order to provide the required height for the lid/adaptor combination to come into contact with the activation element of a particular coffee maker. For example, when the adaptor 36 is used in combination with the lid 28 as shown in FIGS. 4 and 6; the upper surface 29 of the lid 28 may activate an actuator of one coffee maker and the upper surface 37 may activate an actuator of a second coffee maker. Similarly, as shown in FIGS. 5 and 7, the upper surface 29 of the lid 28 may activate an actuator of one coffee maker, the first elevation 39 of the adaptor 38 may activate an actuator of a second coffee maker, and the second elevation 41 of the adaptor 48 may activate an activator of a third coffee maker.

In the preferred embodiment, a twelve cup carafe 10 (FIGS. 6 and 7) may typically be about 5.925 inches in diameter and have a height of about 5.113 inches. The top opening of the carafe would have a reduced diameter of about 5.325 inches, and the neck of the carafe would be about 1.294 inches in height. The ten cup carafe (FIGS. 4 and 5) would be essentially the same dimensions, except that it would be about 4.438 inches in height.

In the preferred embodiment, the lid 18 would have an outer diameter of about 5.575 inches and would have a downward extending flange 50 around its outer edge, so as to engage the top surface of the carafe. At the front portion of the lid, the radius would be about 2.45 inches.

On the lid, the arcuate slots 34 would have a length of about 0.52 inches. The front of the slot would have a radius of about 1.42 inches and the back of the slot would have a radius of about 1.5 inches. As shown in FIGS. 8 and 9, the four arcuate slots would be evenly spaced around the lid and would be about 90° apart. Each arcuate slot would be displaced 45° from the central axis of the lid.

The central opening 32 of the lid is funnel shaped with the bottom portion of the opening being about 0.75 inches in diameter and with the top being about 1.494 inches in diameter.

In the preferred embodiment, the first adaptor 36 is about 0.275 inches in thickness and the prong 42 is about 0.562 inches in length. The prong has its inner surface about 0.867 inches from the outer edge of the adaptor. The outer radius of the adaptor is 2.288 inches. As shown, there is an arcuate notch 52 in the adaptor, so as to permit the adaptor to fit around the central opening 32 of the lid. This arcuate notch has a radius of about 0.636 inches in the preferred embodiment.

The second adaptor 38 is very much similar in construction. The prongs 44 extend downward about 0.562 inches and the inner surface of the prongs are about 1.367 inches from the outer edge of the adaptor. The base portion 54 of the second adaptor is 0.360 inches in the thickness and the raised surface 48 is about 0.32 inches in height. As shown, the arcuate notch 56 has a radius of about 0.847 inches. The raised surface 48 has an inner radius of about 1.049 inches and an outer radius of 1.987 inches. It then tapers down at a 40° angle to the base of the adaptor for an additional 0.269 inches.

The outer radius of the adaptor is 2.788 inches.

The invention is described in detail with reference to a particular embodiment, but it should be understood that various other modifications can be affected and still be within the spirit and scope of the invention.

I claim:

1. An adaptor and a lid wherein the adaptor is detachably connected to the lid and not vertically adjustable with respect to the lid when attached thereto, and wherein the lid is hingedly detachably connected to a carafe, wherein the lid is at a first predetermined elevation, adapted for activating an actuator of a first device and wherein said adaptor is at a second predetermined elevation, adapted for activating an activator of a second device so that when the carafe is positioned in said first or said second device, the respective actuators can be activated.

2. The adaptor of claim 1, wherein the adaptor forms an arcuate portion of a circle.

3. The adaptor of claim 2, wherein the adaptor is adapted to have a plurality of radial positions on said lid.

* * * * *